(12) United States Patent
Bruland et al.

(10) Patent No.: US 6,554,494 B2
(45) Date of Patent: Apr. 29, 2003

(54) ARRANGEMENT FOR CONNECTING LIGHT WAVEGUIDES

(75) Inventors: Alexander Bruland, Rahden (DE); Ludger Leve, Rahden (DE); Jens Krause, Rahden (DE); Ralf Schöttelndreier, Minden (DE)

(73) Assignee: HARTING Automotive GmbH & Co. KG (DE)

( * ) Notice: Subject to any disclaimer, the term of this patent is extended or adjusted under 35 U.S.C. 154(b) by 95 days.

(21) Appl. No.: 09/783,639

(22) Filed: Feb. 14, 2001

(65) Prior Publication Data

US 2001/0017965 A1 Aug. 30, 2001

(30) Foreign Application Priority Data

Feb. 23, 2000 (DE) .......................................... 100 08 301

(51) Int. Cl.[7] ................................................. G02B 6/42
(52) U.S. Cl. ......................................................... 385/92
(58) Field of Search ............................... 385/92, 88, 89, 385/75

(56) References Cited

U.S. PATENT DOCUMENTS

| 4,778,240 A | 10/1988 | Komatsu |
| 4,986,762 A | 1/1991 | Keith ........................ 439/131 |
| 5,104,243 A | 4/1992 | Harding ..................... 385/84 |
| 5,561,727 A | 10/1996 | Akita et al. .................. 385/88 |
| 5,615,292 A | 3/1997 | Beckwith .................... 385/89 |
| 5,940,563 A | 8/1999 | Kobayashi et al. ........... 385/92 |

*Primary Examiner*—Rodney Bovernick
*Assistant Examiner*—Mike Stahl
(74) *Attorney, Agent, or Firm*—Cook, Alex, McFarron, Manzo, Cummings & Mehler, Ltd.

(57) ABSTRACT

An arrangement for connecting light waveguides, in which a casing houses a carrier body in which detachable light waveguides provided with fiber end sleeves, optoelectrical components, and also electrical contacts for a connecting plug are arranged.

7 Claims, 5 Drawing Sheets

ARRANGEMENT FOR CONNECTING LIGHT WAVEGUIDES

Figure 1:
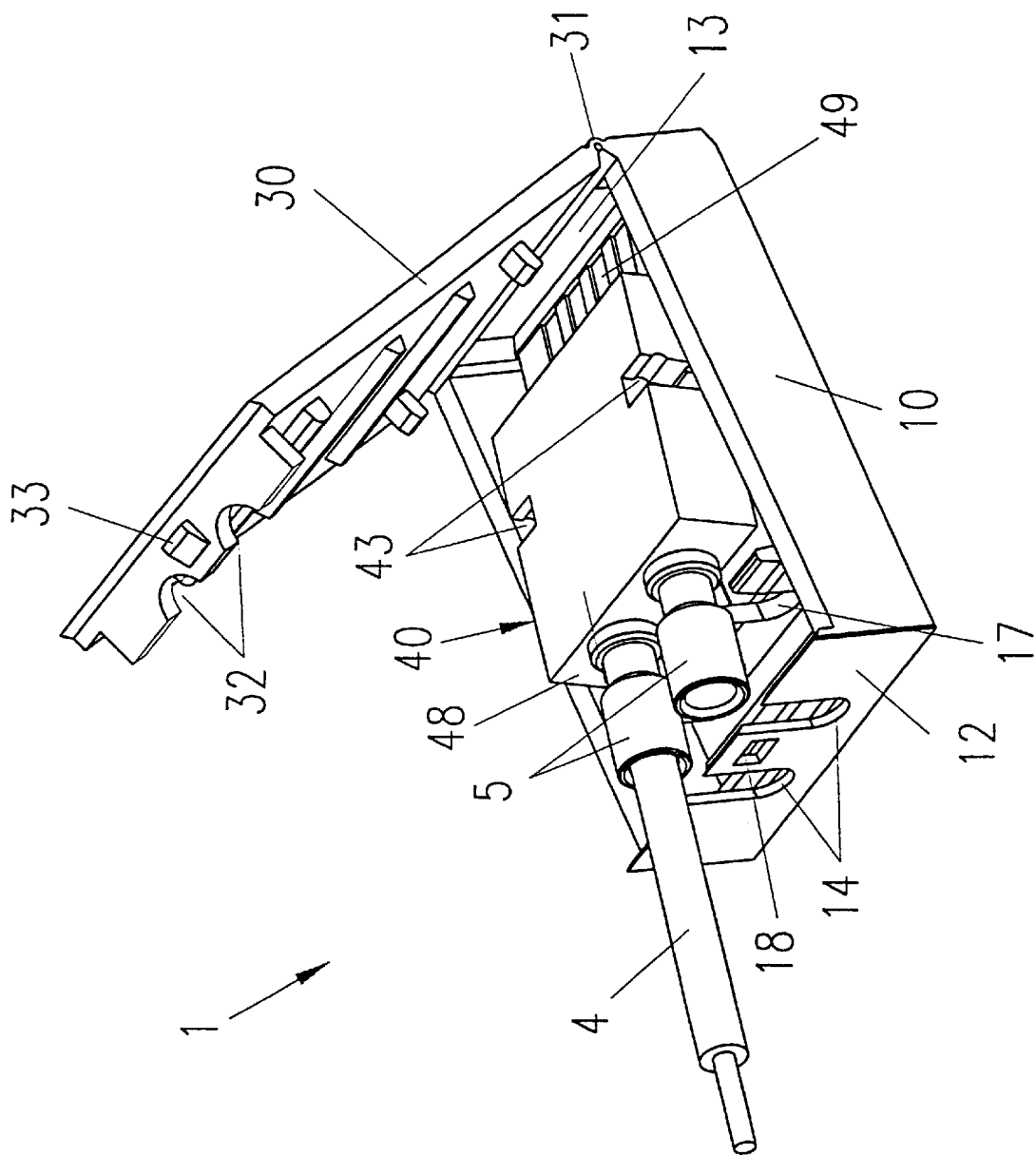

The invention relates to an arrangement for connecting light waveguides, the said arrangement having a casing in which optoelectrical components are arranged.

Plug-in connectors with optoelectrical converters are being used to an increasing extent in industrial communications technology and in the field of automotive engineering because of their insusceptibility to interference from electromagnetic signals, their superior separation, in terms of potential, of the participants to a communication, and their extremely high speeds of data-transmission.

It is known practice, in light waveguide plug-in systems with optical/electrical converters, so-called "transceiver modules", to arrange the converters, separately from the plug-in system, on a circuit board intended for further signal-processing. Under these circumstances, however, problems may arise for the optoelectrical components because of the effect of heat—in the course of a soldering process, for instance.

The underlying object of the invention, therefore, is to construct an arrangement for connecting light waveguides of the type initially mentioned, as a separate, preassembled structural element provided with plug-in connections.

This object is achieved, according to the invention, through the fact that a carrier body with a light waveguide plug-in side and an electrical plug-in side is provided in the casing, and that at least one optoelectrical converter with a light-sensitive face and with electrical connections is arranged in the said carrier body.

Advantageous refinements of the invention are indicated in claims 2 to 7.

The advantages achieved by means of the invention consist particularly in the fact that the arrangement for connecting light waveguides has a casing with a carrier body in which the optoelectrical components which carry out the conversion of optical signals into electrical signals are additionally arranged.

Furthermore, the casing and the carrier body inserted therein are constructed with a plug-in side for light waveguides and a plug-in side with electrical contacts for a counter-plug.

A further advantage of the invention lies in the fact that the arrangement contains a severable optical plug-in connection for light waveguides, so that it is possible, for example, to replace a light waveguide without any problems, especially as the casing is constructed so as to be unlockable without the use of a special tool.

A further advantage lies in the simple mechanical structure of this arrangement, so that, in addition to cost-effective production, rapid assembly with a high degree of security as regards fitting is achieved, reliable functionality being guaranteed by the use of components which have been subjected to final testing in each case. In addition, the simple fitting operation substantially facilitates any servicing which has to be carried out later.

Various embodiments for the connection of a light waveguide permit adaptation of the system to different functions. Thus, the coupling of a light waveguide to an optoelectrical converter may take place not only inside but also outside the carrier body.

Furthermore, it may possibly be of advantage to already connect the light waveguide fixedly to the carrier body during the production process and to combine the freely projecting end of the said light waveguide with any desired optical plug-in connector.

Figure 2:
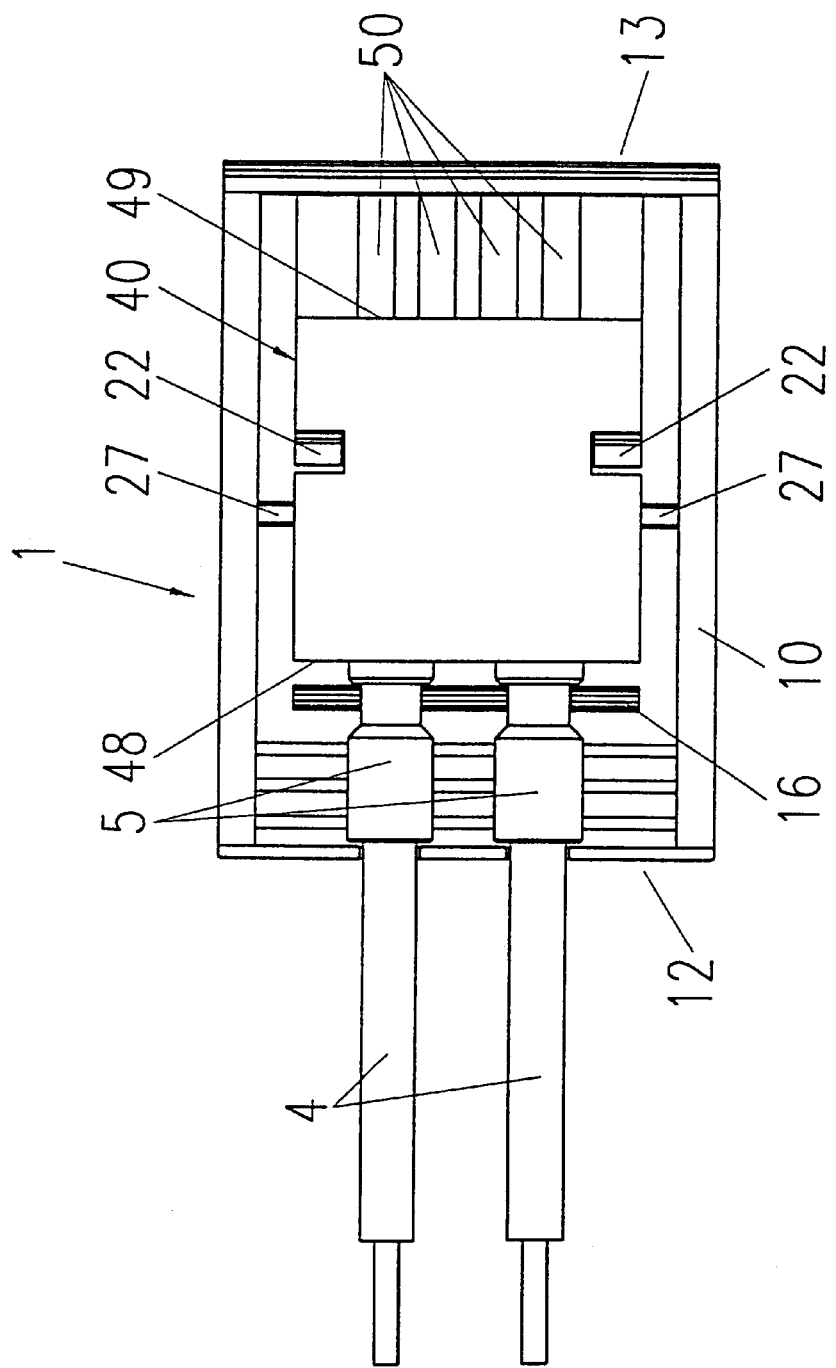
Figure 3:
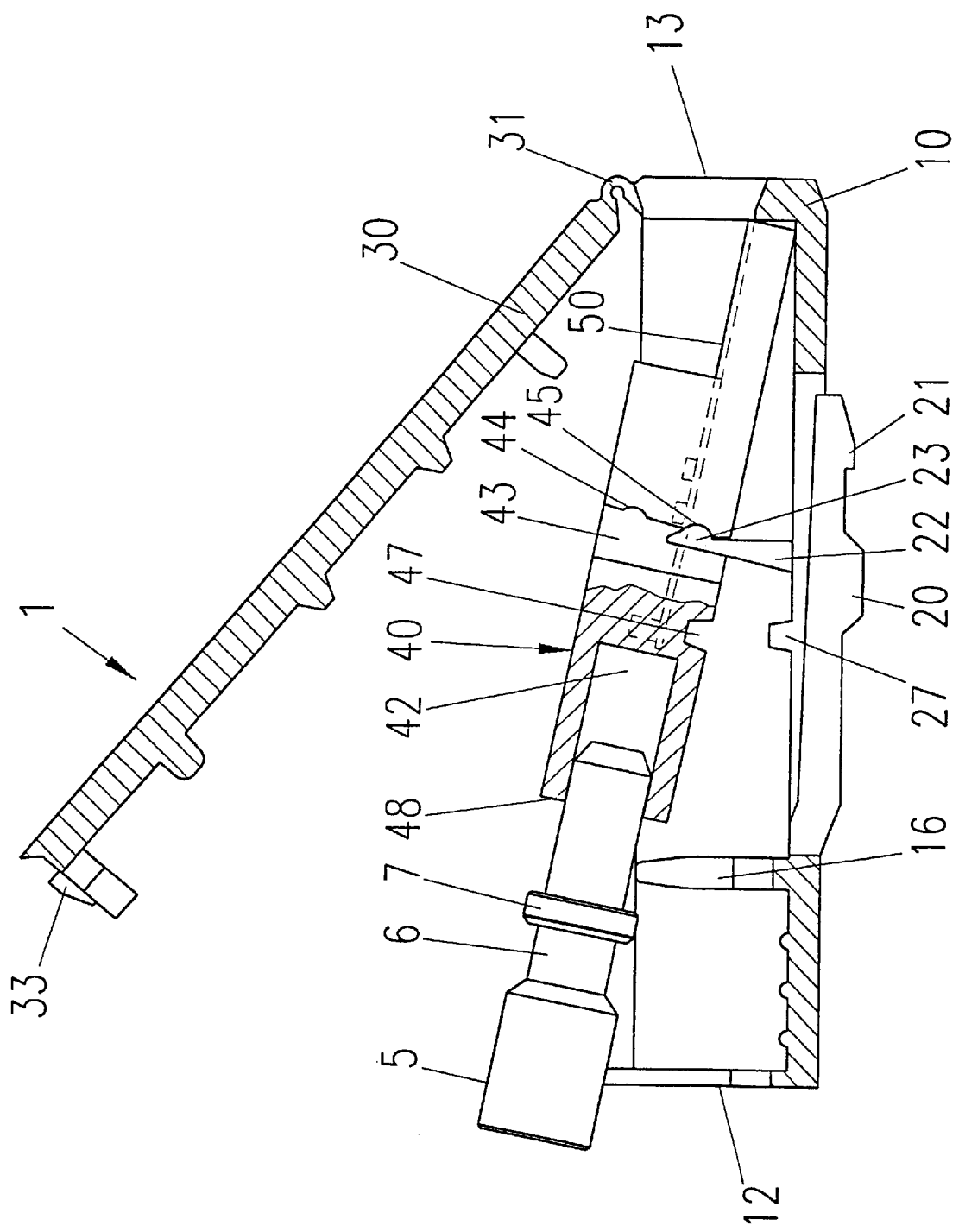
Figure 4:
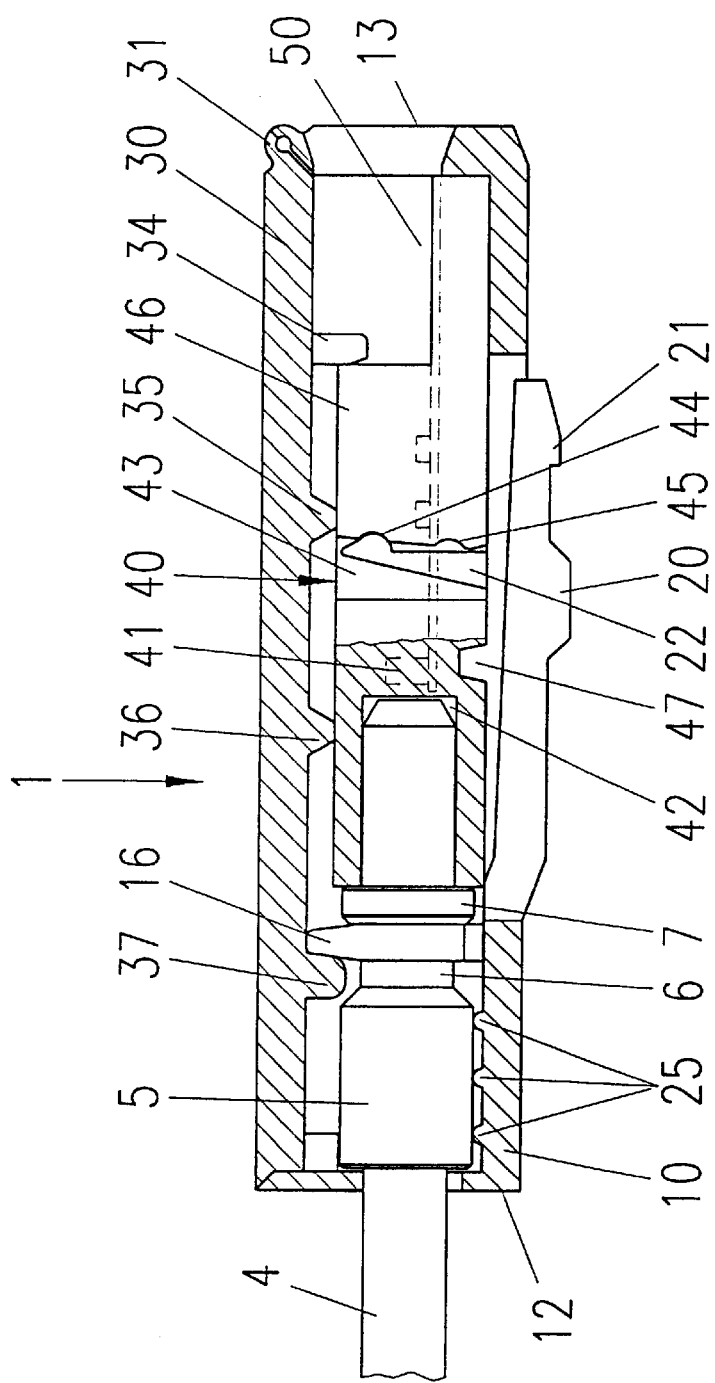
Figure 5:
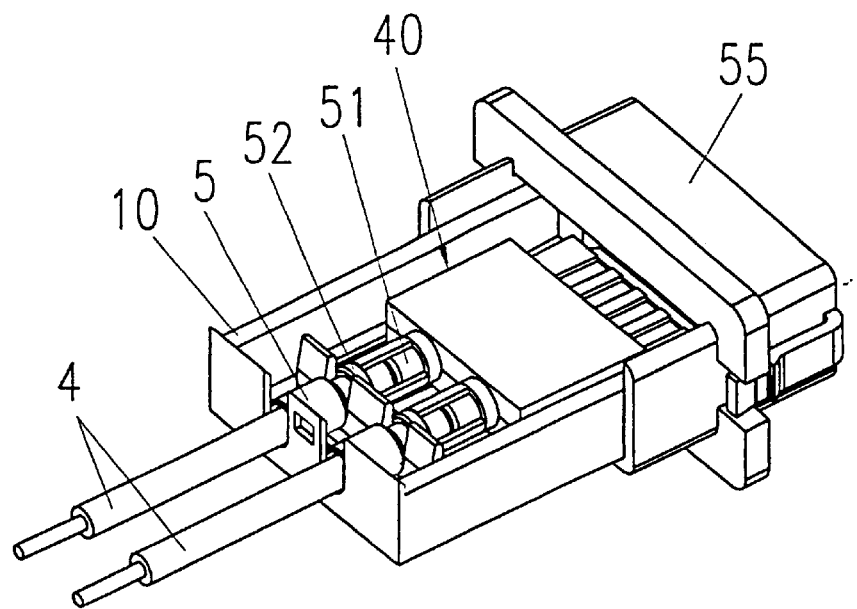
Figure 6:
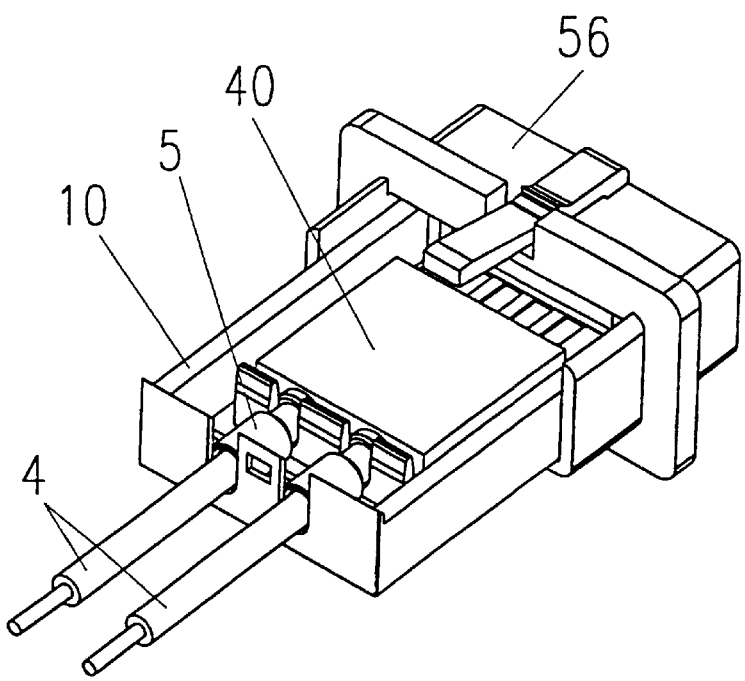

An exemplified embodiment of the invention is represented in the drawings and will be explained in greater detail below. In the said drawings:

FIG. 1 shows a perspective view of the arrangement of the optoelectrical elements in a casing, FIG. 2 shows a top view of the casing with the lid removed, FIG. 3 shows a partial sectional representation through an open casing, FIG. 4 shows a partial sectional representation through a closed casing, FIG. 5 shows a perspective view of a variant of an arrangement of optoelectrical elements, and FIG. 6 shows a perspective view of another variant of an arrangement of optoelectrical elements.

The arrangement for connecting light waveguides is represented in a perspective view in FIG. 1.

The said arrangement consists of a casing 10 with a lid 30 and an inserted carrier body 40. The lid 30 shown in the example, which can be swung open and latched shut, is moulded onto the casing 10 by means of a film hinge 31.

A plug-in side 12 for the light waveguide 4 and a plug-in side 13 with electrical contacts 50 for an electrical connecting plug are provided on the narrow sides of the casing 10.

Under these circumstances, two clearances 14 are provided in the plug-in side 12 for the light waveguides in the lower casing part, and two clearances 32 in the lid, as a round lead-through for the light waveguides 4, while at the opposite plug-in side 13, the casing 10 has a rectangular clearance into which electrical contacts belonging to a connecting plug can be inserted.

Inserted in the interior of the casing 10 is a suitably adapted parallelepipedal carrier body 40 which receives, on the light waveguide plug-in side 48, two light waveguides 4 provided with fiber end sleeves 5, and has electrical contacts 50 which are led out on the electrical plug-in side 49. Provided in the interior of the carrier body 40, which is preferably optically opaque, are optoelectrical converters 41 having additional components which are connected to the electrical contacts 50.

The location of the inserted components can be seen in FIG. 2 in a top view of the casing with the lid removed, the carrier body 40 with the fiber end sleeves 5 and light waveguides 4 being inserted in the middle of the said casing 10.

By means of a bottom rib 27 which is moulded onto the bottom of the casing and engages in a longitudinal bottom groove 47 (not visible here) in the carrier body, the said carrier body 40 is aligned with the two pegs 22 and with the fiber end sleeves 5 which are held in the semicircular clearances 17 in the intermediate wall 16 and in the clearances in the plug-in side 12 in the casing 10.

FIG. 3 shows a partial section, longitudinally, through an open casing 10, the carrier body 40 being shown in an oblique fitting location in which fitting or removal of the plug-in-type light waveguides 4 can be carried out.

In order to bring about this oblique positioning, there are provided in the carrier body 40 two guide grooves 43 which are incorporated at the sides and in each of which a peg 22 with a latching nose 23 moulded on at the upper end is guided.

Two clearances, the latching stages 44 and 45, into which the latching noses 23 snap, are in turn provided in the guide grooves 43. The upper latching stage 44 arrests the carrier body 40 in its end location, flat on the bottom of the casing, while the lower latching stage 45 holds the said carrier body obliquely above the bottom of the casing for a fitting operation. In the oblique fitting location, in which the latching nose 23 snaps into the latching stage 45, the carrier body 40 is pressed against the inner wall of the casing 10 on the electrical plug-in side. In this fitting location, the light waveguides 4 fitted with fiber end sleeves 5 can be conveniently removed from the bores 42 in the carrier body, or pushed into them.

If the light waveguides 4 have been pushed in correctly, the carrier body can be pressed down into its final location, that part of the fiber end sleeves 5 which projects out of the carrier body 40 being positioned in the clearances 17 in the intermediate wall 16 of the casing 10, while the light waveguides 4 are inserted in the clearances 14 in the plug-in region 12.

FIG. 4 shows a partial section, longitudinally, through a closed casing. The light waveguides 4 with the fiber end sleeves 5, and the light-sensitive side of the optoelectrical converter 41 are arranged axially on one optical axis, the design of the carrier body, fiber end sleeve and casing permitting optimum optical coupling which guarantees minimal coupling attenuation in the transmission of the signal between the end faces of the light waveguide fibers and the optoelectrical converter.

The transfer of the electrical signals from the optoelectrical converter 41 takes place by means of the electrical contacts 50, the plug-in side 13 with the said electrical contacts 50 being constructed to receive an electrical connecting plug.

For the purpose of latching the casing to a connecting plug, a locking element 20 with a moulded-on latching hook 21 is provided in the bottom region of the said casing 10.

When the casing 10 is closed, the enclosed carrier body 40 with the fiber end sleeves 5 is mechanically immobilized by various ribs provided in the said casing.

First of all, a bottom rib 27 which is moulded on in the bottom of the casing 10 and which can also be divided up into two separate partial ribs engages in a corresponding longitudinal bottom groove 47 in the bottom region of the carrier body 40. When the lid 30 is lowered, the first rib 34, which is of elongated shape, is laid against the shoulder 46 of the electrical plug-in side 49 of the carrier body 40. Two other ribs 35 and 36 then press on the upper side of the carrier body, and another rib 37 is lowered onto the tapered region 6 of the fiber end sleeve 5. Under these circumstances, the rib 37 exerts on the bevelled part of the intermediate wall 16 a laterally acting force which is directed axially against the stop 7, which is constructed as a circumferential collar, of the fiber end sleeve 5, and continues to act on the carrier body 40 so that the said fiber end sleeve is guided by constraint in the bore 42 into an optimum position in relation to the optoelectrical converter 41, in order to achieve a guaranteed position with respect to the air gap which is to be adhered to between the end face of the light waveguide 4 and the light-sensitive face of the optoelectrical converter 41.

Three other semicircular ribs 25 are provided in the bottom of the casing 10 in the region of the fiber end sleeves 5 for the purpose of supporting the latter. Finally, the round clearances 32 in the light waveguide plug-in region 12 of the lid 30 are pressed onto the sheath of the light waveguides 4, and the latching means 33 and 18 on the lid and casing latch with one another (see also FIG. 1). Furthermore, there is constructed, in the central bottom region of the casing, a locking element 20 which is cut out so as to be free on three sides and moulded on in a resilient manner on one side, so that the casing 10 can be plugged, like an electric plug, into a connecting plug not shown here, and can be locked by means of a latching hook 21 which is provided in a suitable manner.

The connection can be unlocked again by perpendicular pressure on the locking element 20.

Represented in FIG. 5 is a variant for connecting light waveguides, in which provision is made for a light waveguide 4 provided with a fiber end sleeve 5 to be coupled outside the carrier body 40. For this purpose, there is led out of the said carrier body 40 a coupling element 51 which is surrounded by a holding element 52 for receiving the fiber end sleeve 5, so that the light waveguide 4 is arranged on one optical axis with the optoelectrical converter 41 let into the carrier body. Fitting takes place in a manner analogous to that already described in FIG. 4.

Another variant for connecting light waveguides is represented in FIG. 6. In this case, the light waveguide 4 (with the fiber end sleeve 5) is already fixedly connected to the carrier body 40 during the operation for producing the latter, it being possible to equip that end of the light waveguide 4 which projects out of the casing 10 with any desired light wave plug-in connector.

In addition, FIGS. 5 and 6 also indicate other possible variants of connecting plugs 55, 56 with different latching means, which plugs are in this case constructed, for example, as plug-in connectors for wall mounting in a casing.

What is claimed is:

1. Arrangement for connecting light waveguides, the arrangement having a casing in which optoelectrical components are arranged, characterized in that a carrier body (40) with a light waveguide plug-in side (48) and an electrical plug-in side (49) is provided in the casing (10), the carrier body (40) has, on the light waveguide plug-in side (48), at least one bore (42) for receiving a light waveguide (4) provided with a fiber end sleeve (5), and that at least one optoelectrical converter (41) with a light-sensitive face and with electrical connections is arranged in the carrier body (40), characterized in that within the at least one bore (42) in the carrier body (40), the fiber end sleeve (5) is pressed in the axial direction against a stop (7), the end face of the fiber end sleeve (5) having a defined air gap in relation to the light-sensitive face of the optical converter (41).

2. Arrangement for connecting light waveguides, according to claim 1, characterized in that the carrier body (40) has, on the light waveguide plug-in side (48), at least one bore (42) for receiving a light waveguide (4) provided with a fiber end sleeve (5), the end face of the light waveguide pointing, after insertion in the bore (42), towards the light-sensitive face of the optoelectrical converter (41), and that electrical contacts (50) for making contact with a connecting plug (55, 56), which contacts are connected to the optoelectrical converter (41), are led out on the electrical plug-in side (49) of the carrier body (40).

3. Arrangement for connecting light waveguides, according to claim 1, characterized in that a locking element (20) which is provided with latching means (21) and by means of which the casing (10) can be locked to a connecting plug is constructed in the bottom of the said casing (10).

4. Arrangement for connecting light waveguides, the arrangement having a casing in which optoelectrical components are arranged, characterized in that a carrier body (40) with a light waveguide plug-in side (48) and an electrical plug-in side (49) is provided in the casing (10), and that at least one optoelectrical converter (41) with a light-sensitive face and with electrical connections is arranged in the carrier body (40), characterized in that the casing (10) is provided with a lid (30) that can be swung open, the lid (30) being connected to the casing (10) via a film hinge (31), and that the lid (30) can be latched to the casing (10) by means of latching means (33).

5. Arrangement for connecting light waveguides, the arrangement having a casing in which optoelectrical components are arranged, characterized in that a carrier body (40) with a light waveguide plug-in side (48) and an electrical plug-in side (49) is provided in the casing (10), and that at least one optoelectrical converter (41) with a light-sensitive face and with electrical connections is arranged in the carrier body (40), characterized in that pegs (22) which project into guide grooves (43) in the carrier body (40) are provided in the casing (10), that the pegs (22) are provided with latching noses (23), and that latching clearances (44, 45), in which the latching noses (23) of the pegs (22) engage, are provided at different heights in the guide grooves (43), the carrier body (40) being held in an oblique fitting location or in a final location.

6. Arrangement for connecting light waveguides, the arrangement having a casing in which optoelectrical components are arranged, characterized in that a carrier body (40) with a light waveguide plug-in side (48) and an electrical plug-in side (49) is provided in the casing (10), and that at least one optoelectrical converter (41) with a light-sensitive face and with electrical connections is arranged in the carrier body (40), characterized in that rib-like projections (25, 27, 34, 35, 36, 37), by means of which the carrier body (40) is immobilized when the casing (10) is closed, are provided in the casing (10) below and above the carrier body (40).

7. Arrangement for connecting light waveguides, the arrangement having a casing in which optoelectrical components are arranged, characterized in that a carrier body (40) with a light waveguide plug-in side (48) and an electrical plug-in side (49) is provided in the casing (10), and that at least one optoelectrical converter (41) with a light-sensitive face and with electrical connections is arranged in the carrier body (40), characterized in that coupling between a light waveguide (4) provided with a fiber end sleeve (5) and the light-sensitive face of the optoelectrical converter (41) takes place by means of a coupling element (51) outside the carrier body (40), and that a holding element (52) connects the coupling element (51) and fiber end sleeve (5) to the carrier body (40).

* * * * *